June 30, 1931. P. H. JAMES ET AL 1,812,485
MACHINE FOR CUTTING DESIGNS IN GLASS
Filed July 15, 1929 2 Sheets-Sheet 1
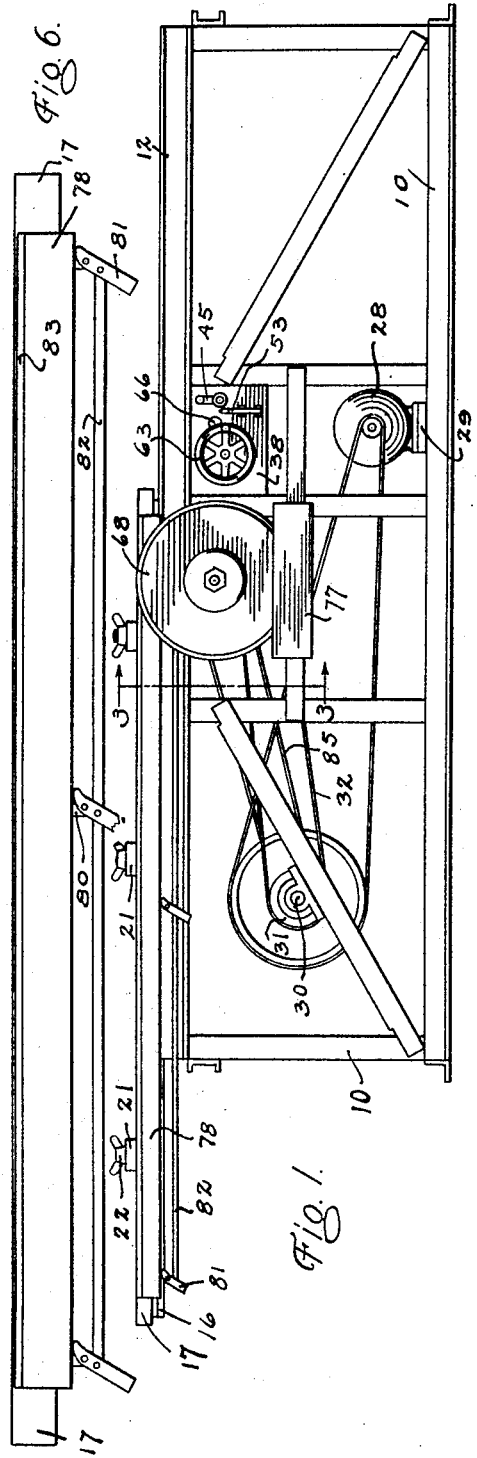
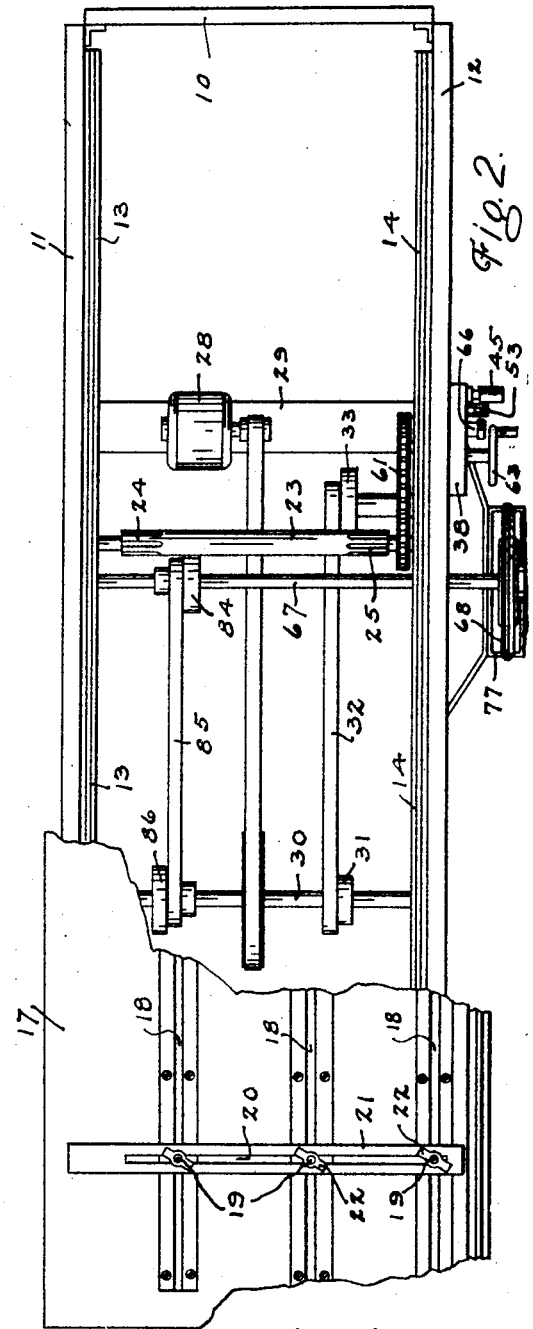
Inventors.
Parker H. James, and
Harry C. Woodsmall,
By Minturn & Minturn,
Attorneys.

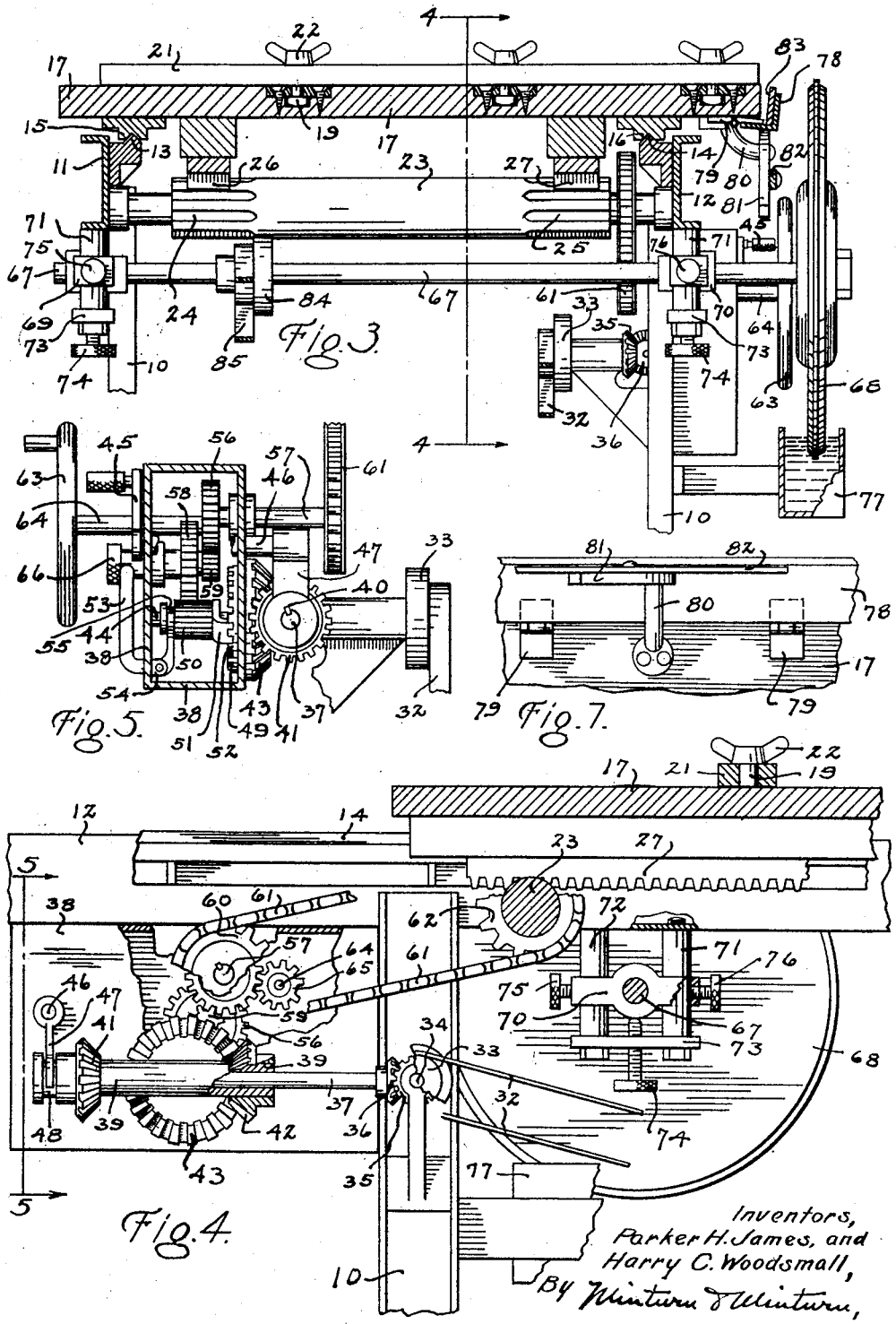

Patented June 30, 1931

1,812,485

UNITED STATES PATENT OFFICE

PARKER H. JAMES AND HARRY C. WOODSMALL, OF INDIANAPOLIS, INDIANA

MACHINE FOR CUTTING DESIGNS IN GLASS

Application filed July 15, 1929. Serial No. 378,409.

This invention relates generally to the art of producing designs on sheets of glass and particularly to machines of the type having a table on which the glass is carried and a grinding wheel adapted to cut the design on the glass from its under side.

The primary objects of this invention reside in the provision of means for adjustably carrying glass sheets over a grinding wheel; in means providing for an initial alignment of the glass over the wheel without having to change the position of the wheel, all without scratching or marring the glass as it is shifted about to the desired positions; in means permitting the rapid and accurate adjustment of the grinding wheel in reference to the upper surface of the glass carrying table; in means permitting the glass to be pressed manually on to the wheel without the use of springs or the like; in means for providing a reciprocating travel of the table in reference to the wheel; and in means that while extremely rigid and durable, may be produced quickly and at a relatively low cost of production.

These and other objects will become apparent in the following description of the invention as illustrated by the accompanying drawings, in which—

Fig. 1 is a side elevation of a machine embodying our invention;

Fig. 2, a top plan view of the machine with the table broken away to disclose the underlying construction;

Fig. 3, a transverse vertical section on the line 3—3 in Fig. 1;

Fig. 4, a longitudinal vertical section through the central part of the machine on the lines 4—4 in Fig. 3;

Fig. 5, a transverse vertical section through the gear box in Fig. 4;

Fig. 6, a side elevation of the preliminary adjusting device; and

Fig. 7, a bottom plan view of a fragmentary length of the adjusting device.

Like characters of reference indicate like parts throughout the several views in the drawings.

We form a rigid frame 10 here shown as being rectangular in shape and as being built up from channel and angle bars to have the top side rails 11 and 12. Along the inner sides of these rails 11 and 12 are positioned the V-ways 13 and 14 to carry thereon the V-guides 15 and 16 which are in turn secured to the under side of the table 17, so that the table 17 may be slidably carried and directed horizontally by the ways 13 and 14.

The table 17 has a plurality of longitudinal T-slots 18, here shown as three in number, entering from its top surface. Within these slots 18 are slidably engaged by the heads, the bolts 19 which project upwardly beyond the surface of the table 17 to pass through the slot 20 of the rule 21 whereby the rule may be adjusted to any angle over the surface of the table and secured thereagainst by means of the thumb screws 22 screw-threadedly engaging the projecting ends of the bolts 19.

Carried transversely between the rails 11 and 12 is a shaft 23 which has pinion gears 24 and 25 cut therein near each end. To the under side of the table 17 is secured the rack bars 26 and 27 in positions adapted to mesh with the respective gears 24 and 25, whereby rotation of the shaft 23 will carry the table 17 longitudinally along the ways 13 and 14.

It is by means of suitable rotation of the shaft 23 that the table 17 is reciprocated as may be desired.

For this purpose I mount an electric motor 28 on the member 29 supported by the frame 10 and belt it to a counter shaft 30 transversely carried by the frame. A cone pulley 31 is secured to the shaft 30 and from it the belt 32 extends to the cone pulley 33 which is carried on the end of the stub shaft 34. A bevel-gear 35 is fixed on the other end of this shaft 34 and meshes with the gear 36 fixed on the end of the shaft 37 which is revolvably supported by the gear box 38.

A sleeve 39 slidably fits over the shaft 37 and is driven thereby through the key 40. At each end of the sleeve 39 is a bevel-gear 41 and 42 respectively. A gear 43 is carried on the outer end of the shaft 44 to be in the path of the gears 41 and 42 so that by shifting the sleeve 39 along the shaft 37 first to have one gear 41 engage the gear 43 and then the other gear 42 engage the gear 43 from the opposite direction. The gear 43 may be revolved selectively in either direction. As a means of shifting the position of the sleeve 39, a hand control lever 45 is fixed on the outer end of the shaft 46 without the box 38 and the inner end of the shaft 46 carries a depending shifter member 47 having its lower end engaged in the annular slot 48 formed in the outer end of the sleeve 39 whereby the rocking of the lever 45 will in turn rock the member 47 to shift the sleeve 39 accordingly.

Within the gear box 38 we fix a clutch member 49 on the shaft 44 to be revolved therewith as the gear 43 may be revolved. A pinion gear 50 is slidably and revolvably carried on the shaft 44 so that it may be shifted longitudinally therealong.

An arm 51 is fixed to the end of the pinion 50 toward the clutch member 49 and has its outer end bent around and directed toward the clutch member so that by shifting the gear 50 toward the clutch member the end of the arm 51 may be caused to engage with the teeth 52 projecting from the member 49 and thereby carry the gear 50 rotatably therewith. To shift the gear 50 toward and away from the clutch member 49, we mount a shifting lever 53 on the face of the gear box 38 by pivotally interconnecting it with the boss 54. The lower end of the lever 53 passes through the wall of the gear box 38 and is bent around upwardly to engage within the annular groove 55 formed in the end of the gear 50, so that by rocking the lever 53 away from the gear box the gear 50 is moved longitudinally of the shaft 44 and the arm 51 disengaged from the member 49. Now between the gear 50 and a gear 56 fixed on the inner end of the shaft 57, is located the reduction gears 58 and 59. On the end of the shaft 57 is mounted a sprocket wheel 60 from which the chain 61 passes to the sprocket wheel 62 on the shaft 23.

In addition to the power drive as above described, we employ a hand drive which consists of the hand wheel 63 which is fixed to the outer end of the shaft 64. The shaft 64 extends to within the gear box 38 and has a pinion gear 65 carried thereon in constant mesh with the gear 56. The hand wheel 63 may be operated independently of the drive through the gear 43 by either shifting the gear 50 to cause the arm 51 to become disengaged from the member 49 or the gear 59 may be slid longitudinally out of mesh with the gear 56 by pulling outwardly on the stop 66, in either of which cases the hand wheel 63 may then be revolved in either direction without interference from the pull of the motor 28.

Approximately at the center of the frame 10 toward its top, is carried the transverse grinding wheel shaft 67 on the outer end of which near the gear box 38 is carried the grinding wheel 68. The shaft 67 is carried revolvably in the boxes 69 and 70, and these two boxes are positioned to have vertical posts 71, 72 slidably receiving the boxes thereon, the posts 71 and 72 passing through projecting arms of the boxes. A plate 73 joins the under sides of each pair of posts 71, 72 and an adjusting screw 74 screw-threadedly passes through each plate to have its upper end contact the under side of the box thereabove. The boxes may be secured in any desired vertical position on the posts 71, 72 by tightening the locking screws 75 and 76, which screws screw-threadedly pass horizontally from the outer side of the arms on the boxes to bear against the cylindrical surface of the posts. A trough 77 is supported from the frame 10 to carry a lubricating or cooling liquid into which the grinding wheel 68 may be partly submerged.

Along the side of the table 17 toward the wheel 68, we mount an angle bar 78 having its vertical edge projecting upwardly along side the table edge, and its horizontal leg extending under the table to be rockably attached thereto by means of a plurality of hinges 79 whereby the angle 78 normally tends to rock around downwardly from along the edge of the table. A number of brackets 80 are fixed to the under side of the table back of the angle 78 and project downwardly and outwardly, each to carry a lever 81 rockably thereon. Three of such levers are here shown and a rod 82 parallel to the angle 78 pivotally interconnects them. The upper ends of these levers 81 are formed to have a face beveled in relation to the edges so that the levers will normally contact the horizontal leg of the angle 78 as indicated in Fig. 6, in which position the angle 78 is allowed to hang downwardly slightly as indicated in Fig. 3.

By pulling any one of the levers 81 to a vertical position the other two levers are moved in unison therewith, and by reason of the upper beveled end, will rock the angle 78 to carry the vertical leg upwardly. On the inside of the vertical leg, we fix to the angle 78 a strip of leather 83 and allow its upper edge to project beyond the angle 78 sufficiently so that when the levers 81 are rocked to vertical positions, the upper edge of the leather 83 is then positioned parallel to but slightly above the top surface of the table 17.

In operating the machine, a piece of glass (not shown) is laid on top of the table 17 to have its outer end hanging over the wheel 68 and initially resting upon the leather 83 out of the contact with the wheel 68, the levers 81 first being swung to their vertical positions. The glass is adjusted angularly around on the table 17 to the desired position in reference to the wheel 68 and the rule 21 is brought up thereagainst as a means of retaining the glass so positioned. The wheel 68 is raised or lowered by corresponding adjustments of the boxes 69 and 70 on the posts 71, 72 to bring its upper edge to the proper position relative to the top surface of the table 17. The periphery of the wheel 68 has been dressed to a conformation adapted to produce the desired design on the glass.

Following the preliminary adjustments of the glass and the wheel, the levers 81 are rocked from their vertical positions to permit the angle 78 to drop downwardly to carry the leather 83 below the plane of the top surface of the table 17 so that the glass may bear against the periphery of the wheel 68. On the shaft 67 is fixed a cone pulley 84 and a belt 85 passed therefrom to around the cone pulley 86 secured to the counter shaft 30, the speed of the wheel 68 being varied by shifting the belt 85 to the respective steps of the pulleys 84 and 86.

The shaft 30 being constantly driven in one direction of rotation by the motor 28 will cause the table 17 to be moved along the ways 13 and 14 first in one direction and then in the other direction to carry the glass back and forth over the wheel 68 as the lever 45 may be shifted to carry the gears 41 and 42 into and out of mesh with the gear 43. By shifting the lever 45 intermediate of the two extreme positions neither gear 41 nor 42 is meshed with the gear 43 so that the table 17 is then allowed to remain stationary although the motor 28 continues to run. For short travel, the hand wheel 63 may be employed as above described independently of the drive from the motor 28.

While we have here shown and described our invention in the one form as now best known to us, it is obvious that many structural changes may be made therefrom without departing from the spirit of the invention, and we therefore do not desire to be limited to that precise form any more than may be required by the following claims.

We claim:

1. For cutting designs on glass, the combination of a frame, a table maintained on the frame in fixed vertical relation thereto but adapted to be moved in a horizontal plane thereover, a shaft below the table and projecting at one end beyond the edge of the table, a grinding wheel on said end of the shaft, and means for adjusting said shaft in a vertical plane and maintaining said shaft in that plane to permit the cutting edge of said wheel to be raised and lowered in relation to the top of said table, and glass elevating means along said edge of the table.

2. In a design cutting machine for glass, a table, a bar along one edge of the table, and means for raising and lowering said bar to have an upper edge presented thereby respectively above and below the top surface of the table.

3. For cutting designs on glass, the combination of a frame, a table maintained on the frame in fixed vertical relation thereto but adapted to be moved in a horizontal plane thereover, a shaft below the table and projecting at one end beyond the side of the table, a grinding wheel on said end of the shaft, and means for adjusting said shaft in a vertical plane and maintaining said shaft in that plane to permit the cutting edge of said wheel to be raised and lowered in relation to the top of said table, glass elevating means along an edge of the table, power means for reciprocating said table past said wheel, and hand means for reciprocating the table independently of the power means.

4. In a design cutting machine for glass, a table, a bar along one edge of the table, and means for raising and lowering said bar to have an upper edge presented thereby respectively above and below the top surface of the table, and a grinding wheel positioned to present a cutting edge at the side of said table with said bar being carried therebetween.

5. In a design cutting machine for glass, a table, a bar along one edge of the table, and means for raising and lowering said bar to have an upper edge presented thereby respectively above and below the top surface of the table, and a grinding wheel positioned to present a cutting edge at the side of said table with said bar being carried therebetween, means for moving said table past said wheel, and said bar moving means being carried by said table.

In testimony whereof we affix our signatures.

PARKER H. JAMES.
HARRY C. WOODSMALL.